(12) United States Patent
Himmelmann

(10) Patent No.: US 10,570,957 B2
(45) Date of Patent: Feb. 25, 2020

(54) HIGH LOAD CAPACITY HYBRID FOIL BEARING

(71) Applicant: Hamilton Sundstrand Corporation, Charlotte, NC (US)

(72) Inventor: Richard A. Himmelmann, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 16/544,171

(22) Filed: Aug. 19, 2019

(65) Prior Publication Data

US 2019/0368543 A1 Dec. 5, 2019

Related U.S. Application Data

(63) Continuation of application No. 15/238,301, filed on Aug. 16, 2016, now Pat. No. 10,385,915.

(51) Int. Cl.

| F16C 17/02 | (2006.01) |
|---|---|
| F16C 27/02 | (2006.01) |
| F01D 25/16 | (2006.01) |
| F01D 25/24 | (2006.01) |
| F04D 25/04 | (2006.01) |
| F04D 25/06 | (2006.01) |
| F04D 29/056 | (2006.01) |
| F04D 29/057 | (2006.01) |

(Continued)

(52) U.S. Cl.
CPC .............. *F16C 27/02* (2013.01); *B64D 13/02* (2013.01); *F01D 15/08* (2013.01); *F01D 25/16* (2013.01); *F01D 25/162* (2013.01); *F01D 25/24* (2013.01); *F04D 25/045* (2013.01); *F04D 25/06* (2013.01); *F04D 29/056* (2013.01); *F04D 29/057* (2013.01); *F04D 29/281* (2013.01); *F04D 29/286* (2013.01); *F04D 29/4206* (2013.01); *F16C 17/024* (2013.01); *B64D 2013/0603* (2013.01); *F05D 2240/50* (2013.01); *F05D 2250/61* (2013.01); *F16C 2326/43* (2013.01)

(58) Field of Classification Search
CPC ...... F16C 17/024; F01D 25/16; F01D 25/162; F04D 29/057
See application file for complete search history.

(56) References Cited

U.S. PATENT DOCUMENTS

| 6,848,828 B2 | 2/2005 | Nishijima et al. |
|---|---|---|
| 8,083,413 B2 | 12/2011 | Ertas |

(Continued)

FOREIGN PATENT DOCUMENTS

| EP | 2187072 B1 | 9/2012 |
|---|---|---|
| WO | WO2011044428 A2 | 4/2011 |
| WO | WO2014134260 A1 | 9/2014 |

OTHER PUBLICATIONS

Extended European Search Report for European Patent Application No. 17185470.6, dated Feb. 5, 2018, 8 pages.

(Continued)

*Primary Examiner* — Thomas R Hannon
(74) *Attorney, Agent, or Firm* — Kinney & Lange, P.A.

(57) ABSTRACT

A bearing includes a bearing sleeve with a first portion and a second portion adjacent to the first portion. A bump foil extends along an inner face of the first portion of the bearing sleeve and a metal mesh extends along an inner face of the second portion of the bearing sleeve. A top foil extends along an inner face of the bump foil of the first portion and the metal mesh of the second portion.

20 Claims, 13 Drawing Sheets

(51) Int. Cl.
  *F04D 29/28*   (2006.01)
  *F04D 29/42*   (2006.01)
  *B64D 13/02*   (2006.01)
  *F01D 15/08*   (2006.01)
  *B64D 13/06*   (2006.01)

(56) References Cited

U.S. PATENT DOCUMENTS

| | | |
|---|---|---|
| 8,998,493 B2 | 4/2015 | Park et al. |
| 9,181,977 B2 | 11/2015 | Park et al. |
| 9,482,274 B2 | 11/2016 | Ertas et al. |
| 2011/0243485 A1 | 10/2011 | Kume et al. |
| 2015/0275967 A1 | 10/2015 | Ryu |
| 2015/0362012 A1 | 12/2015 | Ermilov |
| 2016/0333927 A1 | 11/2016 | Rimpel |

OTHER PUBLICATIONS

Feng, Kai; Liu, Yuman; Zhao, Xueyuan; and Liu, Wanhui, Experimental Evaluation of the Structure Characterization of a Novel Hybrid Bump-Metal Mesh Foil Bearing, Journal of Tribology, Apr. 2016, vol. 138, pp. 021702-1 through 021702-9.

European Communication Pursuant to Article 94(3) EPC for European Patent Application No. 17185470.6, dated May 9, 2019, 4 pages.

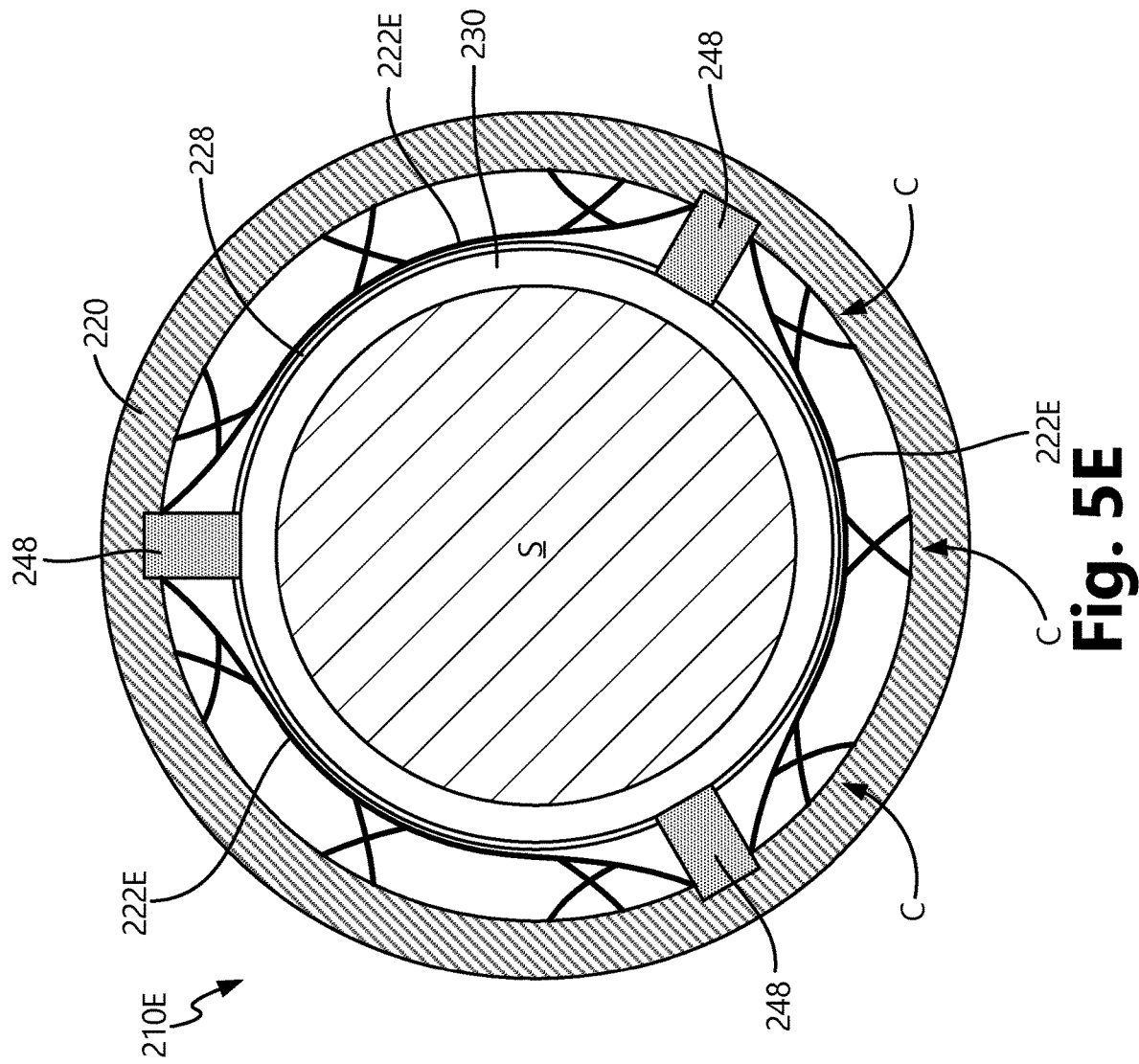

HIGH LOAD CAPACITY HYBRID FOIL BEARING

CROSS-REFERENCE TO RELATED APPLICATION(S)

This application is a continuation of U.S. application Ser. No. 15/238,301 filed Aug. 16, 2016 for "HIGH LOAD CAPACITY HYBRID FOIL BEARING", which is incorporated by reference in its entirety.

BACKGROUND

The present invention relates to a bearing, and in particular, to a hybrid foil bearing.

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressured air sufficiently that it must be cooled, even if the ambient air temperature is very low. Thus, under most conditions, heat must be removed from air by the air cycle machine before the air is delivered to the aircraft cabin. A cabin air compressor can be used to compress air for use in an environmental control system. The cabin air compressor includes a motor to drive a compressor section that in turn compresses air flowing through the cabin air compressor.

Both air cycle machines and cabin air compressors have a shaft extending down a central axis that rotates. Bearings are positioned outward from the shaft to reduce friction between the rotating shaft and stationary components. Historically, ball bearings were used in air cycle machines and cabin air compressors. Ball bearings face limitations in that they wear out quickly and thus need to be replaced often. Further, ball bearings require oil for operation and the smell of the oil can seep into the air flowing through the air cycle machine and/or cabin air compressor before the air is delivered to the aircraft cabin.

To overcome the limitations of ball bearings, air bearings were later developed for use in air cycle machines and cabin air compressors. Air bearings create an air gap between a rotating part and the bearing components so that the air gap acts as the bearing. Examples of air bearings that can be used are bump foil bearings and metal mesh bearings. Bump foil bearings include a bump foil positioned between a top foil and a bearing sleeve. Metal mesh bearings include a metal mesh positioned between a top foil and a bearing sleeve. With both bump foil bearings and metal mesh bearings the top foil is positioned around the shaft. As air flows along the shaft, the top foil is pushed outward from the shaft to create an air gap between the rotating shaft and the top foil. Bump foil bearings have a high stiffness and can support high loads but have low dampening characteristics. The low dampening characteristics can lead to a phenomenon known as sub-synchronous whirl, which is the problem of uncontrolled vibration of the shaft. Metal mesh bearings have high dampening characteristics, but sag over time causing the shaft to become off centered.

SUMMARY

A bearing includes a bearing sleeve with a first portion and a second portion adjacent to the first portion. A bump foil extends along an inner face of the first portion of the bearing sleeve and a metal mesh extends along an inner face of the second portion of the bearing sleeve. A top foil extends along an inner face of the bump foil of the first portion and the metal mesh of the second portion.

A rotary machine includes a shaft that is configured to rotate in the rotary machine, a stationary component positioned outward from the shaft, and a hybrid foil bearing positioned between the shaft and the stationary component. The hybrid foil bearing has a first bump foil portion and a first metal mesh portion adjacent to the first bump foil portion.

BRIEF DESCRIPTION OF THE DRAWINGS

FIG. 5E is a cross-sectional view of a fifth embodiment of a foil section of the hybrid foil bearing taken along line 5-5 of FIG. 3.

DETAILED DESCRIPTION

Figure 1:
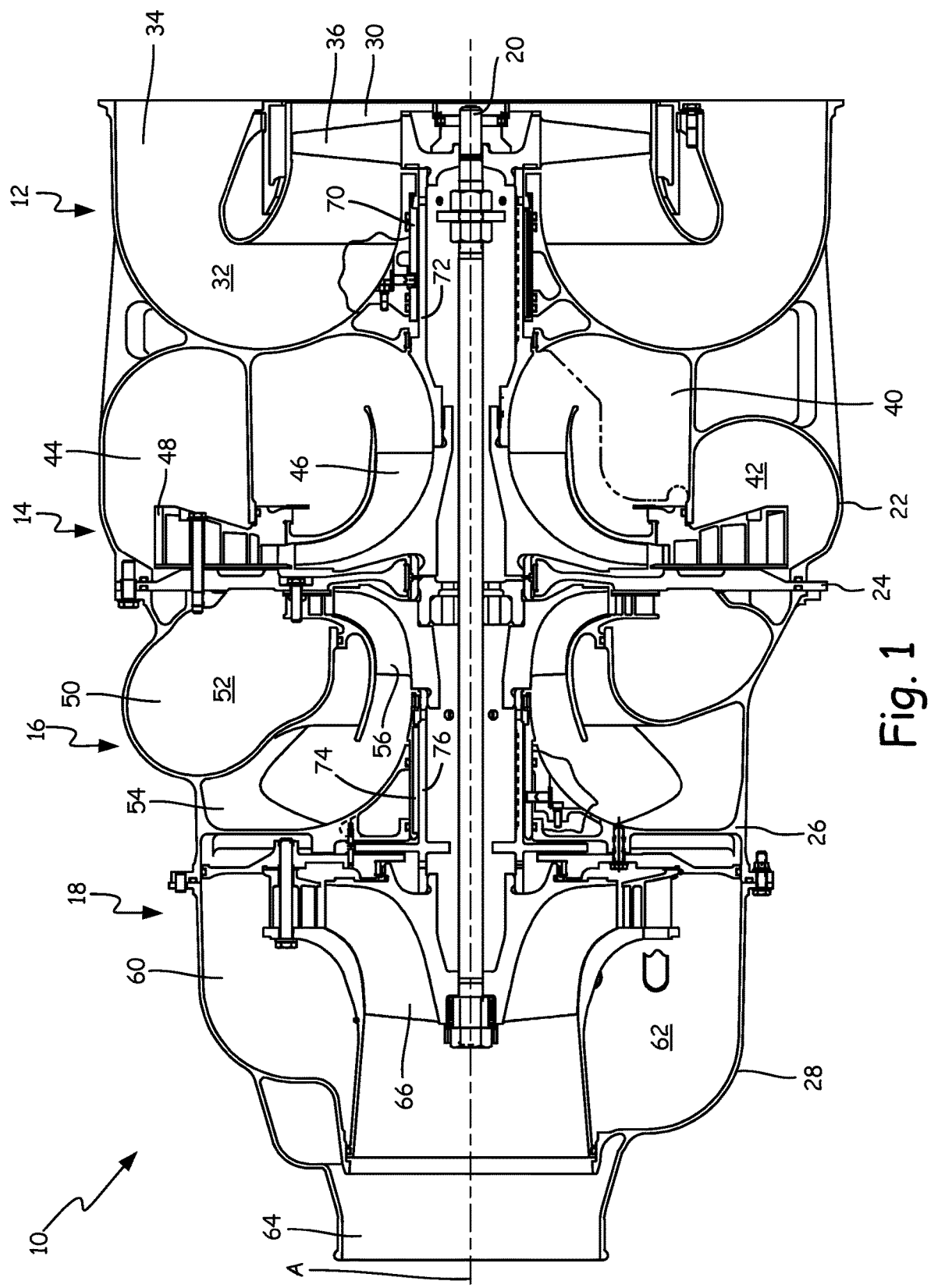
FIG. 1 is a cross-sectional view of an air cycle machine.

FIG. 1 is a cross-sectional view of air cycle machine 10, which includes fan section 12, compressor section 14, first turbine section 16, second turbine section 18, tie rod 20, fan and compressor housing 22, seal plate 24, first turbine housing 26, and second turbine housing 28. Also shown in FIG. 1 is axis A.

Fan section 12, compressor section 14, first turbine section 16, and second turbine section 18 are all mounted on tie rod 20. Tie rod 20 rotates about axis A. Fan and compressor housing 22 is connected to seal plate 24 and first turbine housing 26 with fasteners. Seal plate 24 separates flow paths in fan and compressor housing 22 from flow paths in first turbine housing 26. First turbine housing 26 is connected to second turbine housing 28 with fasteners. Fan and compressor housing 22, first turbine housing 26, and second turbine housing 28 together form an overall housing for air cycle machine 10. Fan and compressor housing 22 houses fan section 12 and compressor section 14, first turbine housing 26 housing first turbine section 16, and second turbine housing 28 houses second turbine section 18.

Fan section 12 includes fan inlet 30, fan duct 32, fan outlet 34, and fan rotor 36. Fan section 12 typically draws in ram air from a ram air scoop or alternatively from an associated gas turbine or other aircraft component. Air is drawn into fan inlet 30 and is ducted through fan duct 32 to fan outlet 34. Fan rotor 36 is positioned in fan duct 32 adjacent to fan inlet 30 and is mounted to and rotates with tie rod 20. Fan rotor 36 draws air into fan section 12 to be routed through air cycle machine 10.

Compressor section 14 includes compressor inlet 40, compressor duct 42, compressor outlet 44, compressor rotor 46, and diffuser 48. Air is routed into compressor inlet 40 and is ducted through compressor duct 42 to compressor outlet 44. Compressor rotor 46 and diffuser 48 are positioned in compressor duct 42. Compressor rotor 46 is mounted to and rotates with tie rod 20 to compress the air flowing through compressor duct 42. Diffuser 48 is a static structure through which the compressor air can flow after it has been compressed with compressor rotor 46. Air exiting diffuser 48 can then exit compressor duct 42 through compressor outlet 44.

First turbine section 16 includes first turbine inlet 50, first turbine duct 52, first turbine outlet 54, and first turbine rotor 56. Air is routed into first turbine inlet 50 and is ducted through first turbine duct 52 to first turbine outlet 54. First turbine rotor 56 is positioned in first turbine duct 52 and is mounted to and rotates with tie rod 20. First turbine rotor 56 will extract energy from the air passing through first turbine section 16 to drive rotation of tie rod 20.

Second turbine section 18 includes second turbine inlet 60, second turbine duct 62, second turbine outlet 64, and second turbine rotor 66. Air is routed into second turbine inlet 60 and is ducted through second turbine duct 62 to second turbine outlet 64. Second turbine rotor 66 is positioned in second turbine duct 62 and is mounted to and rotates with tie rod 20. Second turbine rotor 66 will extract energy from the air passing through second turbine section 18 to drive rotation of tie rod 20.

Air cycle machine 10 further includes first bearing 70, first rotating shaft 72, second bearing 74, and second rotating shaft 76. First bearing 70 is positioned in fan section 12 and is supported by fan and compressor housing 22. First rotating shaft 72 extends between and rotates with fan rotor 36 and compressor rotor 46. A radially outer surface of first rotating shaft 72 abuts a radially inner surface of first bearing 70. Second bearing 74 is positioned in first turbine section 16 and is supported by first turbine housing 26. Second rotating shaft 76 extends between and rotates with first turbine rotor 56 and second turbine rotor 66. A radially outer surface of second rotating shaft 76 abuts a radially inner surface of second bearing 74.

Figure 2:
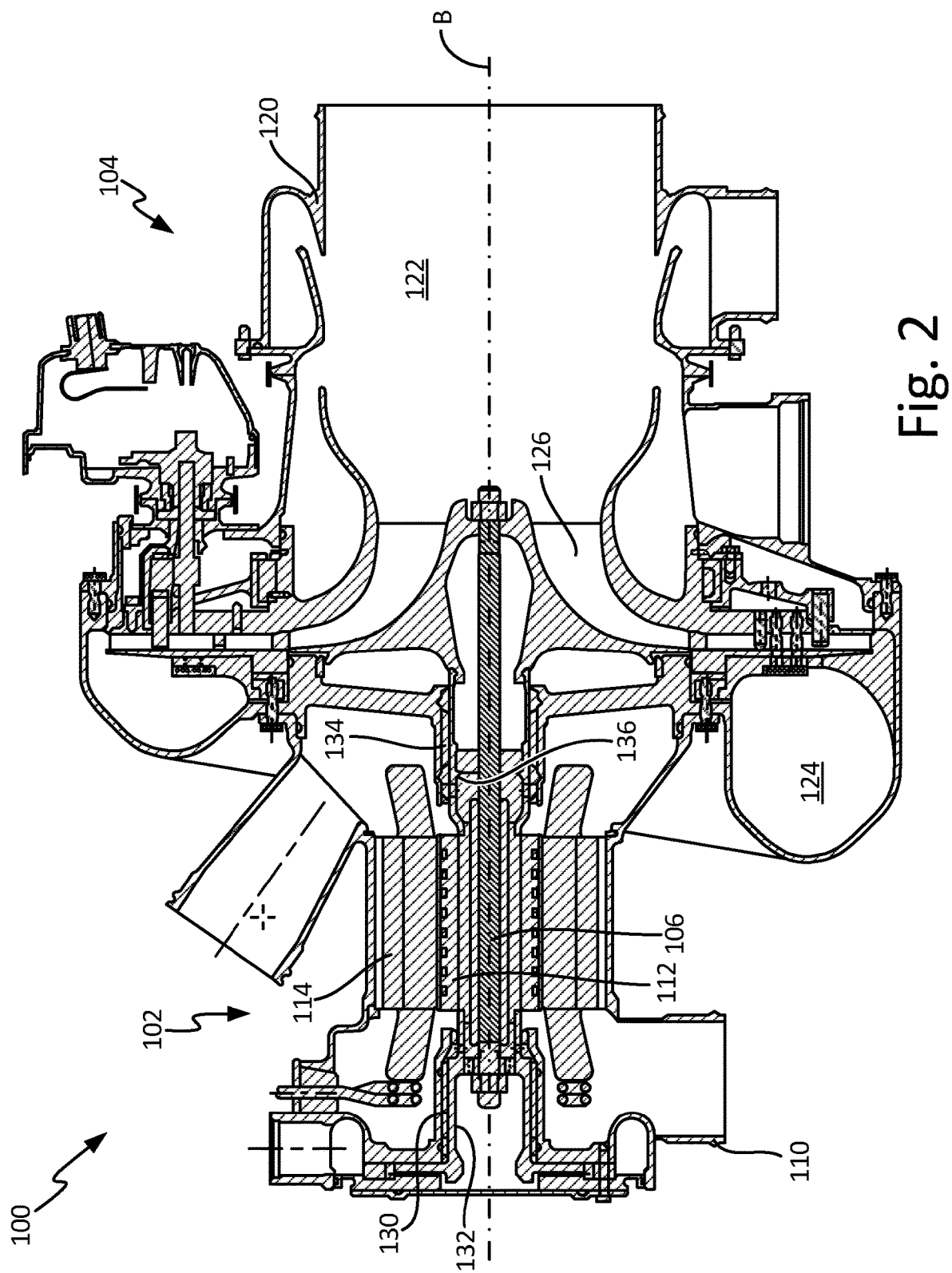
FIG. 2 is a cross-sectional view of an air compressor.

FIG. 2 is cross-sectional view of air compressor 100. Air compressor 100 includes motor 102, compressor section 104, and tie rod 106. Also shown in FIG. 2 is axis B. Motor 102 drives compressor section 104 in air compressor 100. Tie rod 106 extends through air compressor 100 and is centered on axis B. Motor 102 and compressor section 104 are mounted to tie rod 106. Motor 102 will drive tie rod 106 and cause it to rotate, which in turn will rotate compressor section 104.

Motor 102 includes motor housing 110, motor rotor 112, and motor stator 114. Motor housing 110 surrounds motor rotor 112 and motor stator 114. Motor 102 is an electric motor with motor rotor 112 disposed within motor stator 114. Motor rotor 112 is rotatable about axis B. Motor rotor 102 is mounted to tie rod 106 to drive rotation of tie rod 106 in air compressor 100.

Compressor section 104 includes compressor housing 120, compressor inlet 122, compressor outlet 124, and compressor rotor 126. Compressor housing 120 includes a duct that forms compressor inlet 122 and a duct that forms compressor outlet 124. Compressor inlet 122 draws air into compressor section 104. Positioned in compressor housing 120 is compressor rotor 126. Compressor rotor 126 is driven with motor 102 and is mounted on tie rod 106 to rotate with tie rod 106 about axis B. Air that is drawn into compressor section 104 through compressor inlet 122 is compressed with compressor rotor 126 before exiting compressor section 104 through compressor outlet 124.

Air compressor 100 further includes first bearing 130, first rotating shaft 132, second bearing 134, and second rotating shaft 136. First bearing 130 is positioned in motor 102 and is supported by motor housing 110. First rotating shaft 132 is mounted on and rotates with tie rod 106. A radially outer surface of first rotating shaft 132 abuts a radially inner surface of first bearing 130. Second bearing 134 is positioned in motor 102 and is supported by motor housing 110. Second rotating shaft 136 extends between and rotates with motor rotor 112 and compressor rotor 126. A radially outer surface of second rotating shaft 136 abuts a radially inner surface of second bearing 134.

FIGS. 3-8 describe various embodiments of a hybrid foil bearing. Any of the embodiments of the hybrid foil bearing can be used in air cycle machine 10 shown in FIG. 1 and/or air compressor 100 shown in FIG. 2. Air cycle machine 10 shown in FIG. 1 and air compressor 100 shown in FIG. 2 are exemplary rotary machines and the hybrid foil bearing can be used in other rotary machines.

Figure 3:
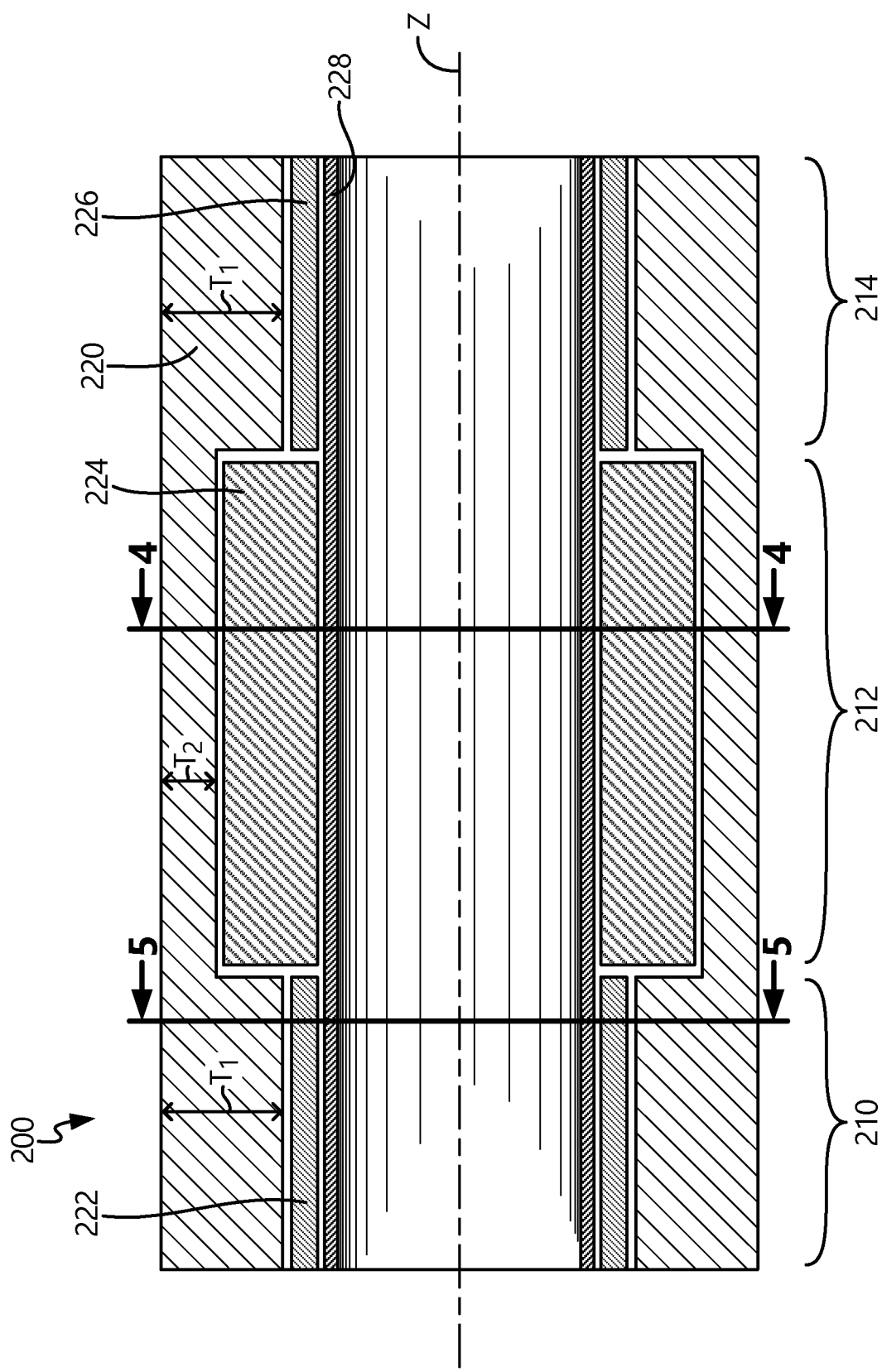
FIG. 3 is a cross-sectional view of a first embodiment of a hybrid foil bearing.

FIG. 3 is a cross-sectional view of a first embodiment of hybrid foil bearing 200. Hybrid foil bearing 200 includes first foil portion 210, metal mesh portion 212, second foil portion 214, bearing sleeve 220, first foil 222, metal mesh 224, second foil 226, and top foil 228. Also shown in FIG. 3 is axis Z.

Hybrid foil bearing 200 includes three sections, including first foil portion 210, metal mesh portion 212, and second foil portion 214. Metal mesh portion 212 is positioned between first foil portion 210 and second foil portion 214. Bearing sleeve 220 has a cylindrical shape and forms a body portion of hybrid foil bearing 200. As seen in FIG. 3, axis Z extends down a center of bearing sleeve 220. Bearing sleeve 220 has a first wall thickness $T_1$ at first foil portion 210 and second foil portion 214, and a second wall thickness $T_2$ at metal mesh portion 212. First wall thickness $T_1$ is greater than second wall thickness $T_2$. In alternate embodiments, bearing sleeve 220 could have the same thickness across the entire bearing sleeve 220.

First foil 222 is a cylindrical shape and is positioned in bearing sleeve 220 adjacent to an inner face of bearing sleeve 220 in first foil portion 210. Metal mesh 224 is a cylindrical shape and is positioned in bearing sleeve 220 adjacent to an inner face of bearing sleeve 220 in metal mesh portion 212. Second foil 226 is a cylindrical shape and is positioned in bearing sleeve 220 adjacent to an inner face of bearing sleeve 220 in second foil portion 214. Top foil 228 is a cylindrical shape and is positioned in bearing sleeve 220. Top foil 228 is adjacent to inner faces of first foil 222, metal mesh 224, and second foil 226.

Figure 4:
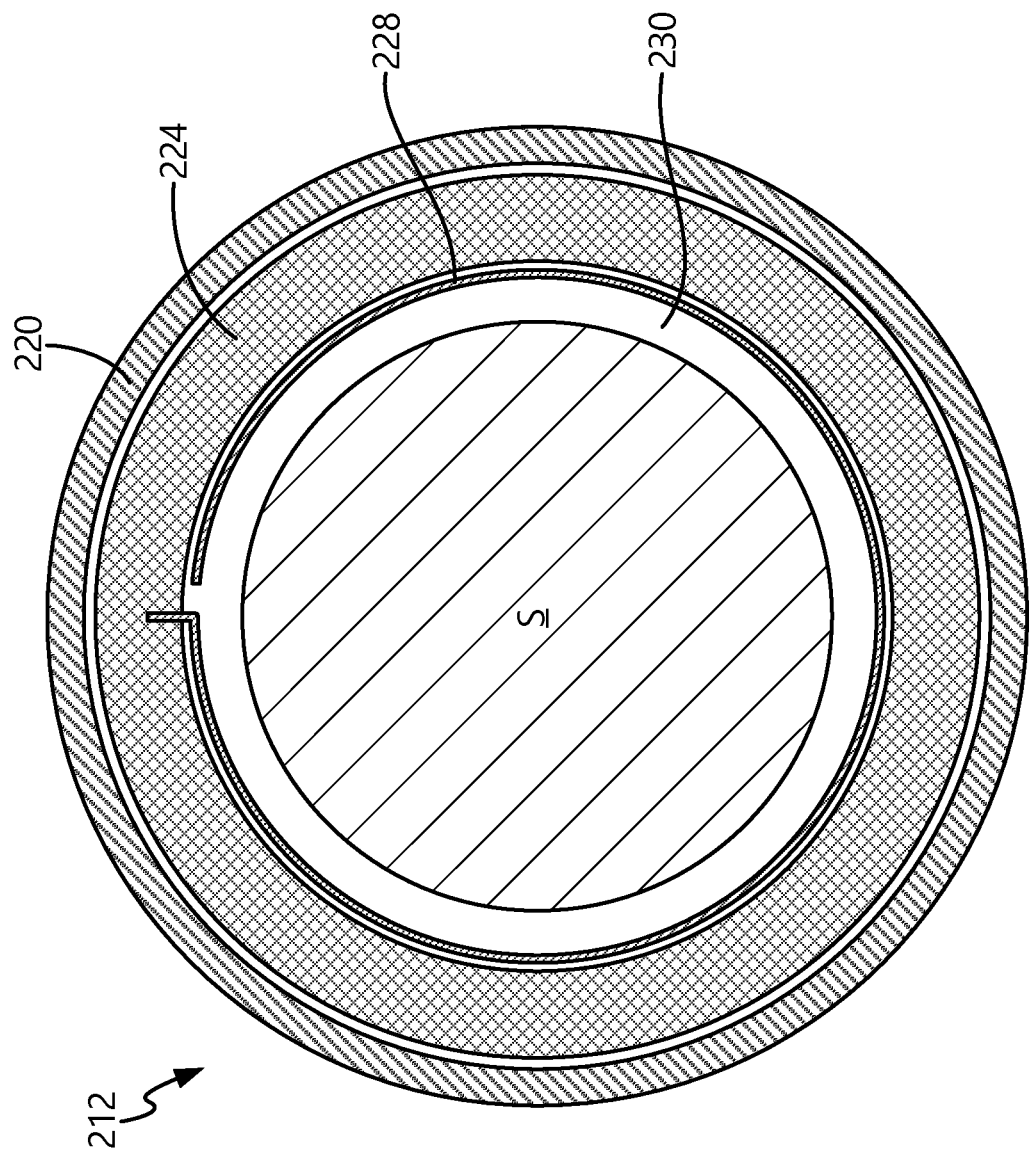
FIG. 4 is a cross-sectional view of a metal mesh section of the hybrid foil bearing taken along line 4-4 of FIG. 3.

FIG. 4 is a cross-sectional view of metal mesh section 212 of hybrid foil bearing 200 taken along line 4-4 of FIG. 3.

Metal mesh section 212 includes bearing sleeve 220, metal mesh 224, top foil 228, and air bearing gap 230. Also shown in FIG. 3 is shaft S.

Bearing sleeve 220 forms an outer body portion of metal mesh section 212 of hybrid foil bearing 200. Positioned along an inner face of bearing sleeve 220 in metal mesh section 212 is metal mesh 224. Metal mesh 224 includes a plurality of metal wires tangled together in a random manner. Metal mesh 224 can be made out of any suitable metal. Positioned along an inner face of metal mesh 224 is top foil 228. A first end of top foil 228 extends into metal mesh 224 to hold top foil 228 in position. In an alternate embodiment, the first of top foil 228 extends through metal mesh 224 and into bearing sleeve 220. There is a gap between the first end of top foil 228 and a second end of top foil 228 so that air can enter the space between shaft S and top foil 228. Shaft S is positioned adjacent to top foil 228 and extends through metal mesh section 212 of hybrid foil bearing 200.

As shaft S rotates, air in hybrid foil bearing 200 will force top foil 228 radially outwards, pushing top foil 228 further into metal mesh 224. This forms air bearing gap 230 between shaft S and top foil 228. The utilization of metal mesh 224 in metal mesh portion 212 gives metal mesh portion 212 good dampening characteristics, as metal mesh 224 has a large number of surfaces contacting one another due to the plurality of wires tangled together that are capable of absorbing the vibrations. The good damping characteristics of metal mesh section 212 reduces vibrations caused by shaft S rotating in hybrid foil bearing 200.

FIGS. 5A-5F show different embodiments of foil section 210 of hybrid foil bearing 200.

Figure 5A:
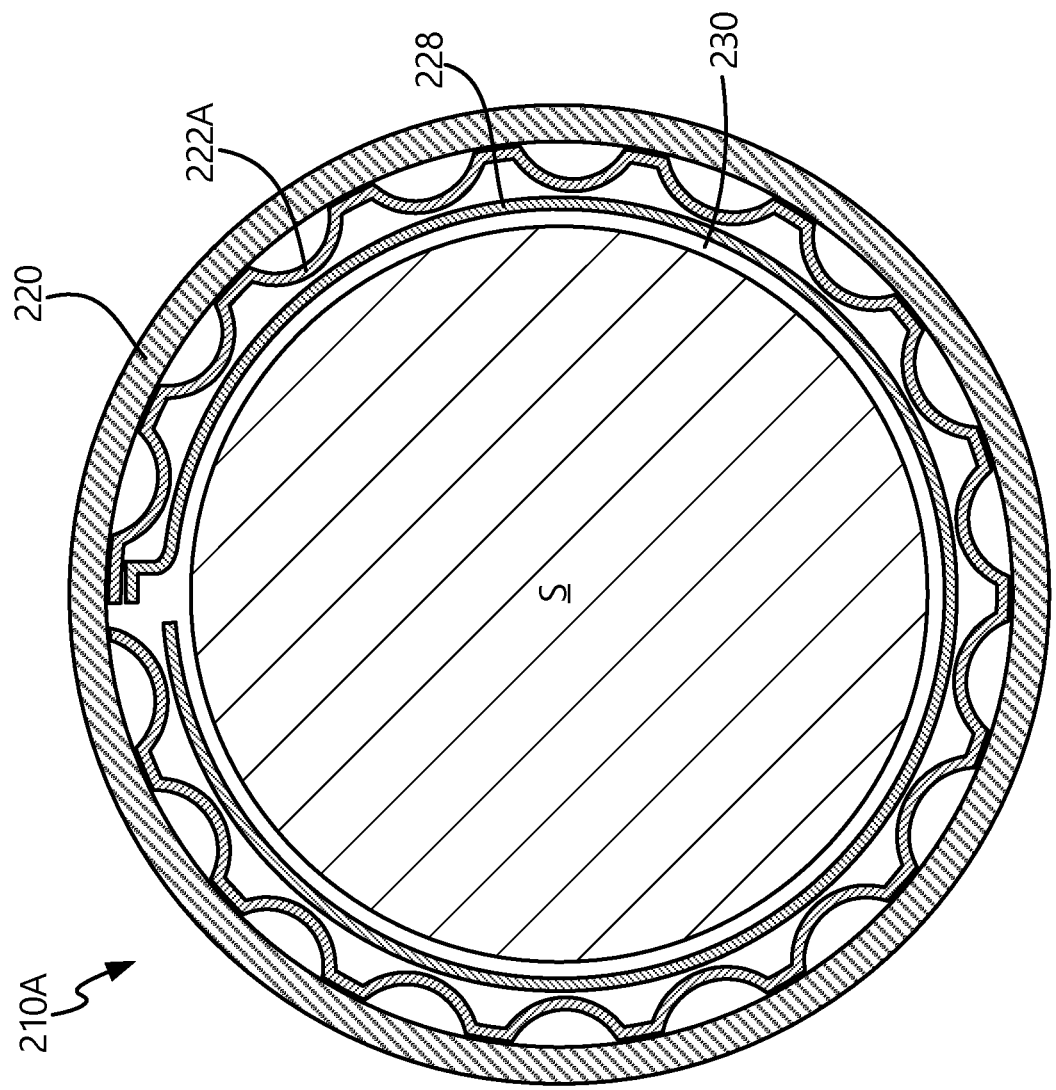
FIG. 5A is a cross-sectional view of a first embodiment of a foil section of the hybrid foil bearing taken along line 5-5 of FIG. 3.

FIG. 5A is a cross-sectional view of a first embodiment of foil section 210A of hybrid foil bearing 200 taken along line 5-5 of FIG. 3. Foil section 210A includes bearing sleeve 220, bump foil 222A, top foil 228, and air bearing gap 230.

Bearing sleeve 220 forms an outer body portion of foil section 210A of hybrid foil bearing 200. Positioned along an inner face of bearing sleeve 220 in foil section 210A is bump foil 222A. Bump foil 222A includes corrugations extending along the sheet. The corrugations can be sized for stiffness and load capacity. Positioned along an inner face of bump foil 222A is top foil 228. A first end of top foil 228 extends radially outward and abuts bump foil 222A to hold top foil 228 in place. There is a gap between the first end of top foil 228 and a second end of top foil 228 so that air can enter the space between shaft S and top foil 228. Shaft S is positioned adjacent to top foil 228 and extends through foil section 210A of hybrid foil bearing 200.

As shaft S rotates, air in hybrid foil bearing 200 will force top foil 228 radially outwards, pushing top foil 228 further into bump foil 222A to cause bump foil 222A to elastically deform. This forms air bearing gap 230 between shaft S and top foil 228. As seen in FIG. 5A, the number of corrugations in bump foil 222A correlates to the number of contact points between top foil 228 and bump foil 222A. The utilization of bump foil 222A in foil portion 210A gives foil portion 210A high stiffness and high load bearing capacity.

Figure 5B:
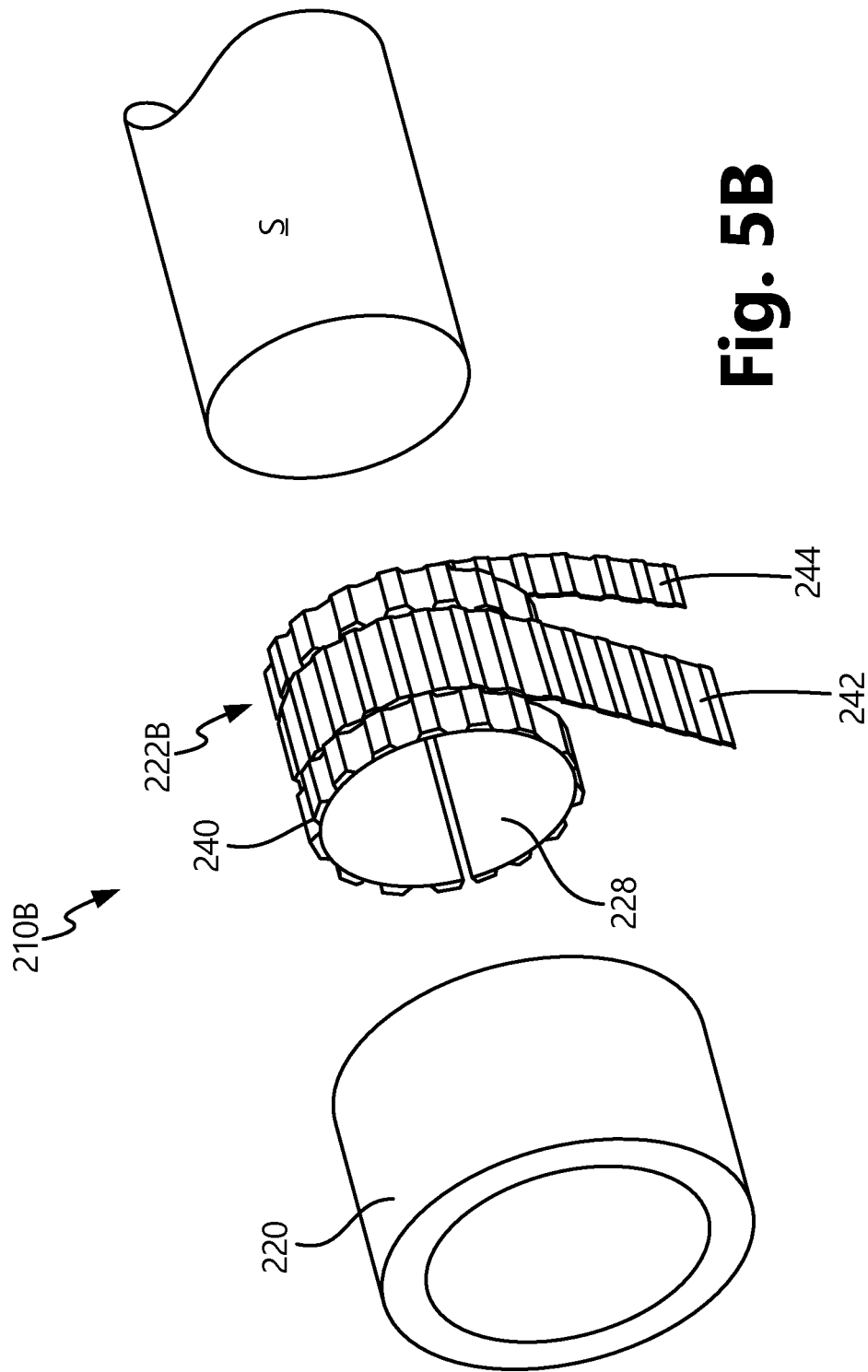
FIG. 5B is an exploded view of a second embodiment of a foil section of the hybrid foil bearing of FIG. 3.

FIG. 5B is an exploded view of a second embodiment of foil section 210B of hybrid foil bearing 200 of FIG. 3. Foil section 210B includes bearing sleeve 220, foil 222B, and top foil 228. Foil 222B includes first foil section 240, second foil section 242, and third foil section 244.

Bearing sleeve 220 forms an outer body portion of foil section 210B of hybrid foil bearing 200. Positioned along an inner face of bearing sleeve 220 in foil section 210B is bump foil 222A. Foil 222B is a bump foil with three different sections, including first foil section 240, second foil section 242, and third foil section 244. First foil section 240, second foil section 242, and third foil section 244 are all bump foils with corrugations and they can have differently sized corrugations. In the embodiment shown in FIG. 5B, first foil section 240 and third foil section 244 have corrugations of the same size. In alternate embodiments, first foil section 240 and third foil section 244 can have corrugations with different sizes. The corrugations can be sized for stiffness and load capacity. Positioned along an inner face of foil 222B is top foil 228. There is a gap between a first end of top foil 228 and a second end of top foil 228 so that air can enter the space between shaft S and top foil 228. Shaft S is positioned adjacent to top foil 228 and extends through foil section 210B of hybrid foil bearing 200.

As shaft S rotates, air in hybrid foil bearing 200 will force top foil 228 radially outwards, pushing top foil 228 further into foil 222B to cause foil 222B to elastically deform. This forms an air bearing gap between shaft S and top foil 228. As seen in FIG. 5B, the number of corrugations in each of first foil section 240, second foil section 242, and third foil section 244 of foil 222B correlates to the number of contact points between top foil 228 and foil 222B. The embodiment shown in FIG. 5B has larger corrugations in first foil section 240 and third foil section 244 on either end of foil 222B. This gives first foil section 240 and third foil section 244 a higher spring rate and top foil 228 forms a greater seal against first foil section 240 and third foil section 244. Second foil portion 242 has smaller corrugations and has a lower spring rate. Air can be trapped in second foil portion 242 so that a higher air pressure is formed in second foil portion 242. This gives foil 222B a higher load capacity. The utilization of foil 222B in foil portion 210B gives foil portion 210B high stiffness and high load bearing capacity.

Figure 5C:
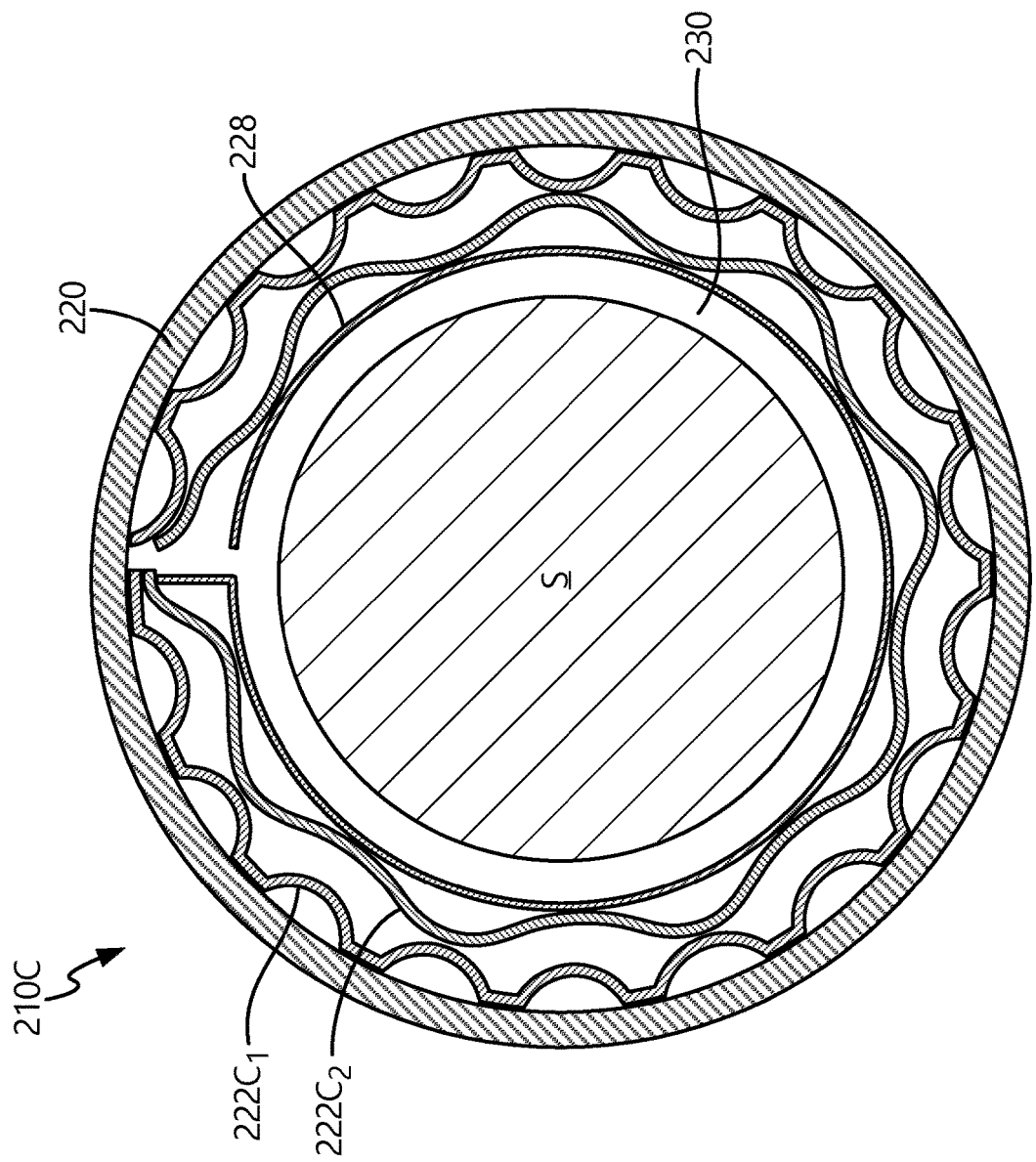
FIG. 5C is a cross-sectional view of a third embodiment of a foil section of the hybrid foil bearing taken along line 5-5 of FIG. 3.

FIG. 5C is a cut-away cross-sectional view of a third embodiment of foil section 210C of hybrid foil bearing 200 taken along line 5-5 of FIG. 3. Foil section 210C includes bearing sleeve 220, foil $222C_1$, foil $222C_2$, top foil 228, and air bearing gap 230.

Bearing sleeve 220 forms an outer body portion of foil section 210C of hybrid foil bearing 200. Positioned along an inner face of bearing sleeve 220 in foil section 210C are foil $222C_1$ and foil $222C_2$. Foil $222C_1$ and foil $222C_2$ are bump foils. Foil $222C_1$ is adjacent to the inner face of bearing sleeve 220 and foil $222C_2$ is adjacent to the inner face of foil $222C_1$. In the embodiment shown in FIG. 5C, foil $222C_1$ has smaller corrugations and foil $222C_2$ has larger corrugations. In alternate embodiments, foil $222C_1$ has corrugations that are larger than the size of the corrugations of foil $222C_2$. Positioned along an inner face of foil $222C_2$ is top foil 228. A first end of top foil 228 extends radially outward and abuts foil 222 $C_2$ to hold top foil 228 in place. There is a gap between the first end of top foil 228 and a second end of top foil 228 so that air can enter the space between shaft S and top foil 228. Shaft S is positioned adjacent to top foil 228 and extends through foil section 210C of hybrid foil bearing 200.

As shaft S rotates, air in hybrid foil bearing 200 will force top foil 228 radially outwards, pushing top foil 228 further into foil $222C_2$ to cause foil $222C_2$ to elastically deform. This forms air bearing gap 230 between shaft S and top foil 228. As seen in FIG. 5C, the number of corrugations in bump foil $222C_2$ correlates to the number of contact points between top foil 228 and foil $222C_2$. Further, there are contact points between foil $222C_2$ and foil $222C_1$. Having contact points between top foil 228 and foil $222C_2$ and between foil $222C_2$ and foil $222C_1$ increases the load capacity of foil $222C_1$ and foil $222C_2$. The utilization of foil $222C_1$ and foil 222C₂ in foil portion 210C gives foil portion 210C high stiffness and high load bearing capacity.

Figure 5D:
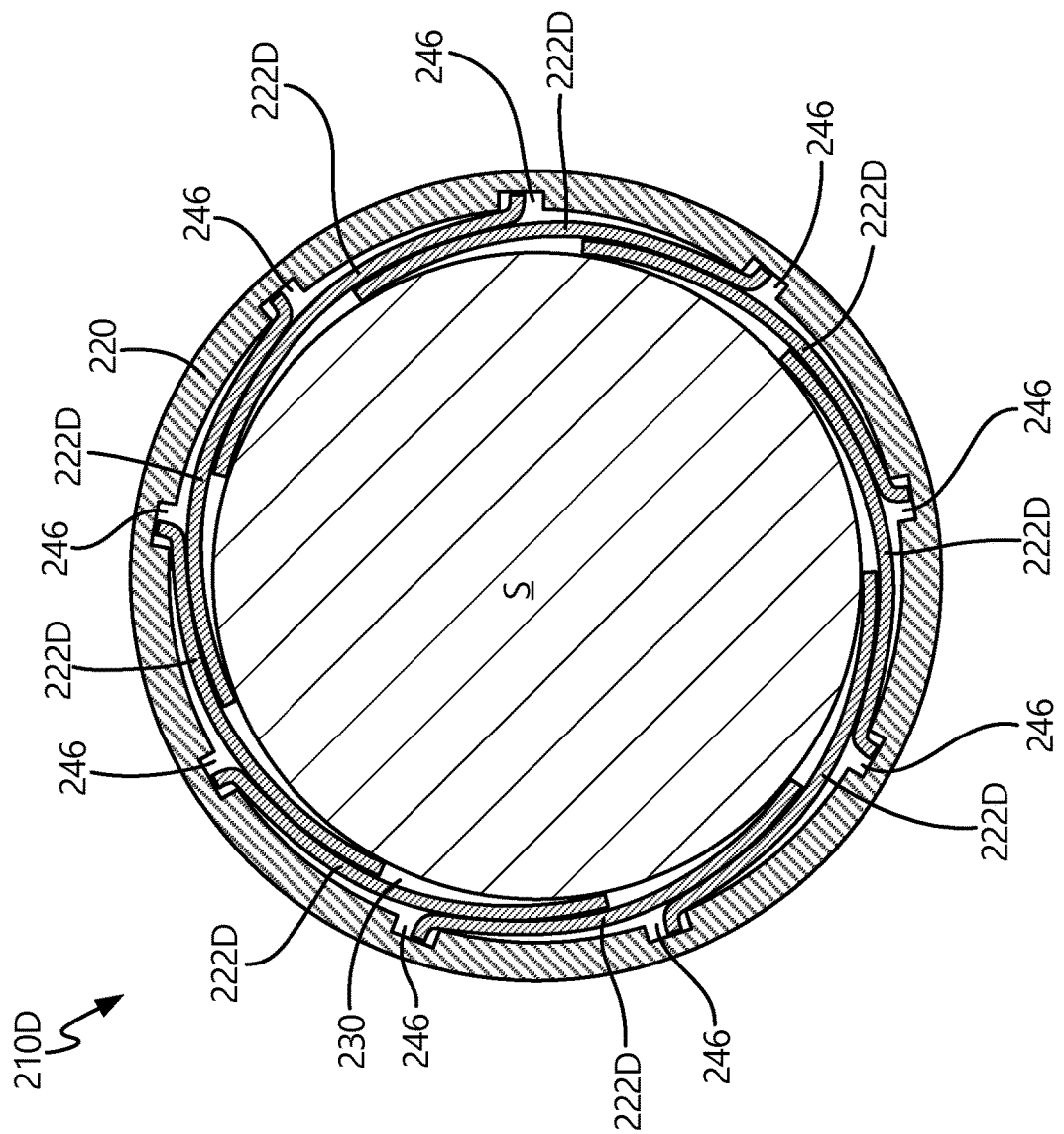
FIG. 5D is a cross-sectional view of a fourth embodiment of a foil section of the hybrid foil bearing taken along line 5-5 of FIG. 3.

FIG. 5D is a cross-sectional view of a fourth embodiment of foil section 210D of hybrid foil bearing 200 taken along line 5-5 of FIG. 3. Foil section 210D includes bearing sleeve 220, plurality of leaf foils 222D, air bearing gap 230, and plurality of notches 246.

Bearing sleeve 220 forms an outer body portion of foil section 210D of hybrid foil bearing 200. Positioned along an inner face of bearing sleeve 220 in foil section 210D are plurality of leaf foils 222D and plurality of notches 246. Bearing sleeve 220 has plurality of notches 246 cut into it on an inner diameter of bearing sleeve 220. A first end of each leaf foil 222D is positioned in one of notches 246 in bearing sleeve 220. Each leaf foil 222D extends outward from one notch 246 and runs along an inner diameter of bearing sleeve 220. A second end of each leaf foil 222D overlaps an adjacent leaf foil 222D. In the embodiment shown in FIG. 5D, foil section 210D includes nine leaf foils 222D, but foil section 210D can include any number of leaf foils 222D in alternate embodiments. Shaft S is positioned adjacent to plurality of leaf foils 222D and extends through foil section 210D of hybrid foil bearing 200.

Foil section 210D does not include a top foil, as plurality of leaf foils 222D extend around the entire inner diameter of bearing sleeve 220 and act as the top foil that abuts shaft S. When foil section 210D is used in hybrid foil bearing 200 shown in FIG. 3, top foil 228 will not extend across foil section 210D. As shaft S rotates, air in hybrid foil bearing 200 will force plurality of leaf foils 222D radially outwards, causing plurality of leaf foils 222D to elastically deform. This forms air bearing gap 230 between shaft S and plurality of leaf foils 222D. The utilization of plurality of leaf foils 222D in foil portion 210D gives foil portion 210D high stiffness and high load bearing capacity.

FIG. 5E is a cross-sectional view of a fifth embodiment of foil section 210E of hybrid foil bearing 200 taken along line 5-5 of FIG. 3. Foil section 210E includes bearing sleeve 220, plurality of foils 222E, top foil 228, air bearing gap 230, and plurality of supports 248.

Bearing sleeve 220 forms an outer body portion of foil section 210E of hybrid foil bearing 200. Positioned along an inner face of bearing sleeve 220 in foil section 210E are plurality of foils 222E and plurality of supports 248. There are three supports 248 in the embodiment shown in FIG. 5E, but there can be any number of supports 248 in alternate embodiments. Plurality of supports 248 extend into bearing sleeve 220 and form three distinct regions along an inner diameter of bearing sleeve 220. Plurality of foils 222E are positioned between plurality of supports 248. Plurality of foils 222E are foil strips. Plurality of foils 222E are arranged to form cantilevers C. In the embodiment shown in FIG. 5E, there are three cantilevers C formed in each region defined by plurality of supports 248. In an alternate embodiment, any number of cantilevers C can be formed. Positioned along an inner face of plurality of foils 222E is top foil 228. Top foil 228 abuts each support 248 in foil section 210E. Shaft S is positioned adjacent to top foil 228 and extends through foil section 210E of hybrid foil bearing 200.

As shaft S rotates, air in hybrid foil bearing 200 will force top foil 228 radially outwards, pushing top foil 228 further into plurality of foils 222E to cause plurality of foils 222E to elastically deform. This forms air bearing gap 230 between shaft S and top foil 228. Cantilevers C formed with plurality of foils 222E absorb stress from the deformation of plurality of foils 222E while helping plurality of foils 222E retain their strength. The utilization of plurality of foils 222E forming cantilevers C in foil portion 210E gives foil portion 210E high stiffness and high load bearing capacity.

Figure 5F:
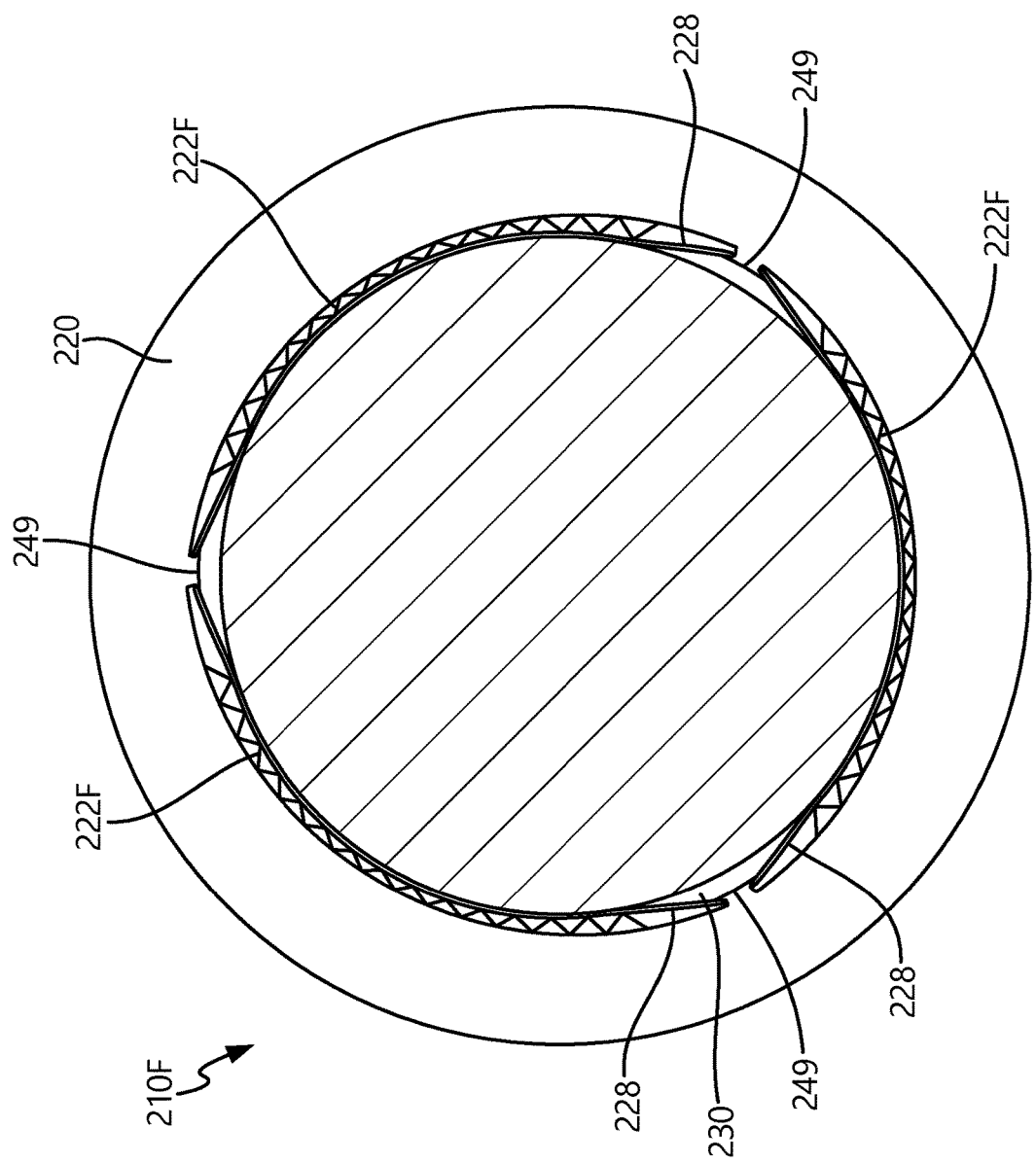
FIG. 5F is a partially cut-away perspective view of a sixth embodiment of a foil section of the hybrid foil bearing of FIG. 3.

FIG. 5F is a partially cut-away perspective view of a sixth embodiment of foil section 210F of hybrid foil bearing 200 of FIG. 3. Foil section 210F includes bearing sleeve 220, plurality of foils 222F, plurality of top foils 228, air bearing gap 230, and plurality of projections 249.

Bearing sleeve 220 forms an outer body portion of foil section 210F of hybrid foil bearing 200. Positioned along an inner face of bearing sleeve 220 in foil section 210F are plurality of foils 222F and plurality of projections 249. Plurality of projections 249 extend radially inwards from bearing sleeve 220 and a lip is formed on either side of each projection 249. There are three projections 249 in the embodiment shown in FIG. 5F, but there can be any number of projections 249 in alternate embodiments. Plurality of projections 249 form three distinct regions along an inner diameter of bearing sleeve 220. Plurality of foils 222F are positioned between plurality of projections 249. Plurality of foils 222F are spring foils. Each foil 222F includes corrugations along extending along the sheet. The corrugations can be sized for strength and stiffness. One foil 222F is positioned in each region formed between plurality of projections 249. Positioned along an inner face of plurality of foils 222F are plurality of top foils 228. There are three top foils 228 in the embodiment shown in FIG. 5F, but there can be any number of top foils 228 to correspond to the number of foils 222F in alternate embodiments. A first end of each top foil 228 is retained with a lip of a first projection 249 and a second end of each top foil 228 is retained with a lip of a second projection 249. Shaft S is positioned adjacent to plurality of top foils 228 and extends through foil section 210F of hybrid foil bearing 200.

As shaft S rotates, air in hybrid foil bearing 200 will force plurality of top foils 228 radially outwards, pushing plurality of top foils 228 further into plurality of foils 222F to cause plurality of foils 222F to elastically deform. This forms air bearing gap 230 between shaft S and plurality of top foils 228. As seen in FIG. 5F, the number of corrugations in plurality of foils 222F correlates to the number of contact points between plurality of top foils 228 and plurality of foils 222F. The utilization of plurality of foils 222F in foil portion 210F gives foil portion 210F high stiffness and high load bearing capacity.

FIGS. 5A-5F are described with reference to foil section 210 of hybrid foil bearing 200, however foil section 214 of hybrid foil bearing 200 can have any of the structures shown in FIGS. 5A-5F. Foil section 210 and foil section 214 can have the same structure or different structures in different embodiments.

FIGS. 3-5F show hybrid foil bearing 200 with foil section 210, metal mesh section 212, and foil section 214. Hybrid foil bearing 200 utilizes the high stiffness and high load bearing capacity of foil section 210 and foil section 214, while also utilizing the good damping characteristics of metal mesh section 212. Bearings that utilize only a foil section face issues with sub-synchronous whirl, which is caused by the uncontrolled vibration of the shaft extending through the bearing. The uncontrolled vibrations occur because bump foils do not have good dampening characteristics. Bearings that utilize only a metal mesh section faces issues with sag and creep over time, causing the shaft extending through the bearing to become off centered. When a shaft becomes off centered, any components that are rotating with the shaft will become off centered and can cause these parts to rub against stationary parts. Rubbing these parts against stationary parts can cause both parts to wear, requiring that the parts be replaced more often and posing a risk that the parts will fail.

Hybrid foil bearing 200 utilizes first foil section 210, metal mesh section 212, and second foil section 214. First foil section 210 and second foil section 214 have high stiffness and high load bearing capabilities. Metal mesh section 212 has good dampening characteristics. Utilizing first foil section 210, metal mesh section 212, and second foil section 214 creates hybrid foil bearing 200 that has high stiffness and high load bearing capabilities while also having good dampening characteristics.

Figure 6:
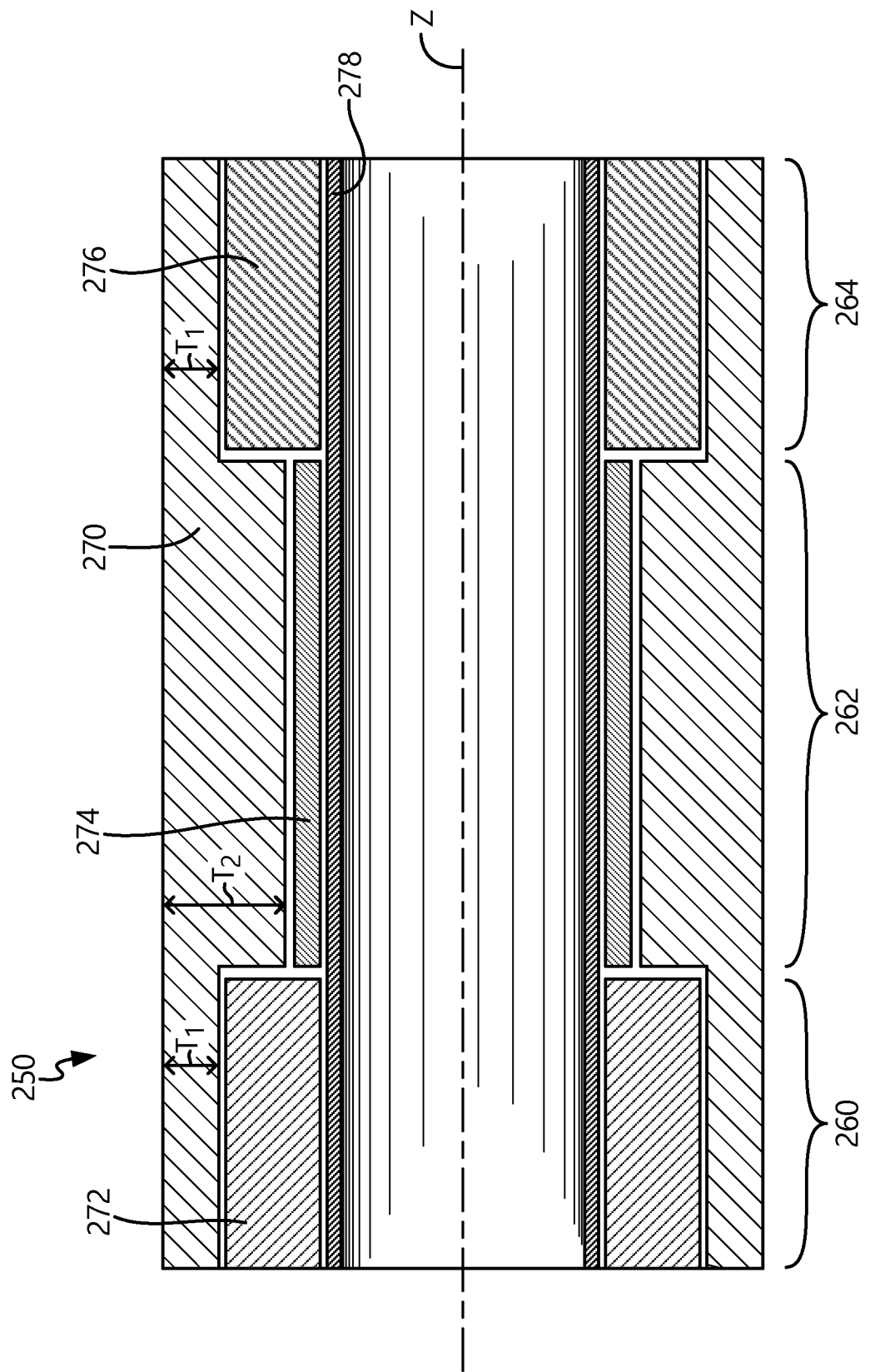
FIG. 6 is a cross-sectional view of a second embodiment of a hybrid foil bearing.

FIG. 6 is a cross-sectional view of a second embodiment of hybrid foil bearing 250. Hybrid foil bearing 250 includes first metal mesh portion 260, foil portion 262, second metal mesh portion 264, bearing sleeve 270, first metal mesh 272, foil 274, second metal mesh 276, and top foil 278. Also shown in FIG. 6 is axis Z.

Hybrid foil bearing 250 includes three sections, including first metal mesh portion 260, foil portion 262, and second metal mesh portion 264. Foil portion 262 is positioned between first metal mesh portion 260 and second metal mesh portion 264. Bearing sleeve 270 has a cylindrical shape and forms a body portion of hybrid foil bearing 250. As seen in FIG. 6, axis Z extends down a center of bearing sleeve 270. Bearing sleeve 270 has a first wall thickness $T_1$ at first metal mesh portion 260 and second metal mesh portion 264, and a second wall thickness $T_2$ at foil portion 262. First wall thickness $T_1$ is less than second wall thickness $T_2$. In alternate embodiments, bearing sleeve 270 has the same thickness across bearing sleeve 270.

First metal mesh 272 is a cylindrical shape and is positioned in bearing sleeve 270 adjacent to an inner face of bearing sleeve 270 in first metal mesh portion 260. Foil 274 is a cylindrical shape and is positioned in bearing sleeve 270 adjacent to an inner face of bearing sleeve 270 in foil portion 262. Second metal mesh 276 is a cylindrical shape and is positioned in bearing sleeve 270 adjacent to an inner face of bearing sleeve 270 in second metal mesh portion 264. Top foil 278 is a cylindrical shape and is positioned in bearing sleeve 270. Top foil 278 is adjacent to inner faces of first metal mesh 272, foil 274, and second metal mesh 276.

Figure 7:
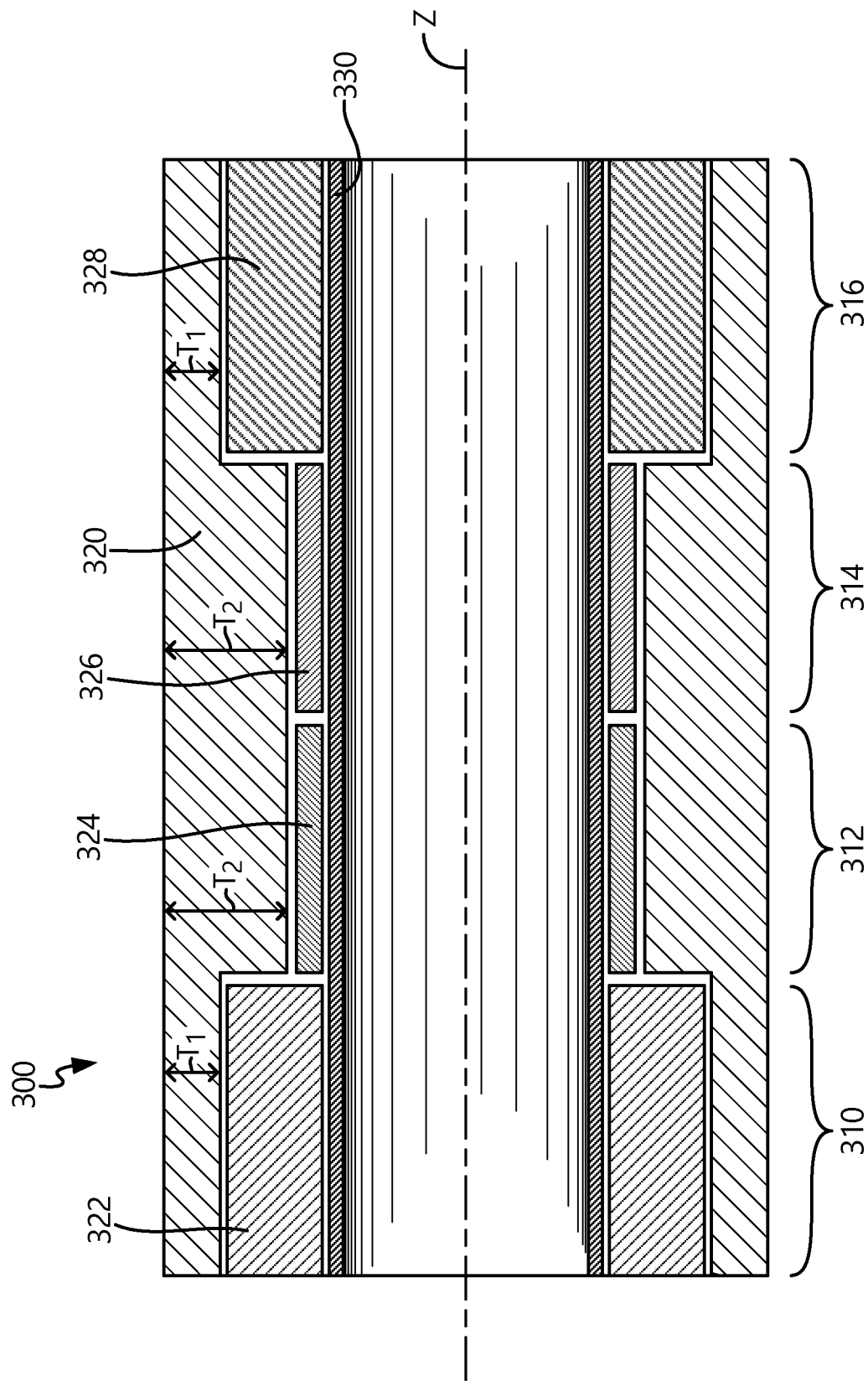
FIG. 7 is a cross-sectional view of a third embodiment of a hybrid foil bearing.

FIG. 7 is a cross-sectional view of a third embodiment of hybrid foil bearing 300. Hybrid foil bearing 300 includes first metal mesh portion 310, first foil portion 312, second foil portion 314, second metal mesh portion 316, bearing sleeve 320, first metal mesh 322, first foil 324, second foil 326, second metal mesh 328, and top foil 330. Also shown in FIG. 7 is axis Z.

Hybrid foil bearing 300 includes four sections, including first metal mesh portion 310, first foil portion 312, second foil portion 314, and second metal mesh portion 316. First foil portion 312 is positioned between first metal mesh portion 310 and second foil portion 314. Second foil portion 314 is positioned between first foil portion 312 and second metal mesh portion 316. Bearing sleeve 320 has a cylindrical shape and forms a body portion of hybrid foil bearing 300. As seen in FIG. 7, axis Z extends down a center of bearing sleeve 320. Bearing sleeve 320 has a first wall thickness $T_1$ at first metal mesh portion 310 and second metal mesh portion 316, and a second wall thickness $T_2$ at first foil portion 312 and second foil portion 314. First wall thickness $T_1$ is less than second wall thickness $T_2$.

First metal mesh 322 is a cylindrical shape and is positioned in bearing sleeve 320 adjacent to an inner face of bearing sleeve 320 in first metal mesh section 310. First foil 324 is a cylindrical shape and is positioned in bearing sleeve 320 adjacent to an inner face of bearing sleeve 320 in first foil portion 312. Second foil 326 is a cylindrical shape and is positioned in bearing sleeve 320 adjacent to an inner face of bearing sleeve 320 in second foil portion 314. Second metal mesh 328 if a cylindrical shape and is positioned in bearing sleeve 320 adjacent to an inner face of bearing sleeve 320 in second metal mesh portion 316. Top foil 330 is a cylindrical shape and is positioned in bearing sleeve 320. Top foil 330 is adjacent to inner faces of first metal mesh 322, first foil 324, second foil 326, and second metal mesh 328.

Figure 8:
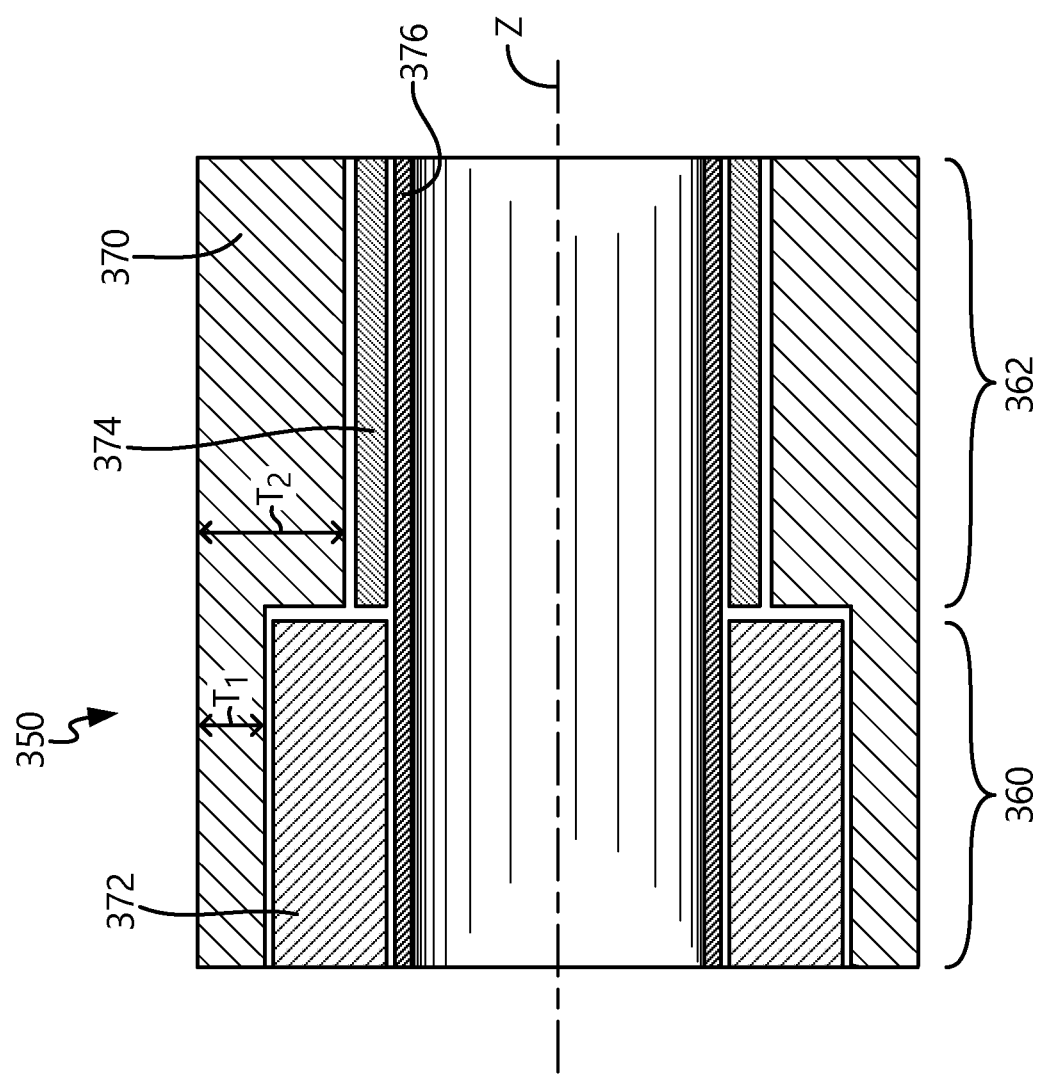
FIG. 8 is a cross-sectional view of a fourth embodiment of a hybrid foil bearing.

FIG. 8 is a cross-sectional view of a fourth embodiment of hybrid foil bearing 350. Hybrid foil bearing 350 includes metal mesh portion 360, foil portion 362, bearing sleeve 370, metal mesh 372, foil 374, and top foil 376. Also shown in FIG. 8 is axis Z.

Hybrid foil bearing 350 includes two sections, including metal mesh portion 360 and foil portion 362. Metal mesh portion 360 is positioned adjacent to foil portion 362. Bearing sleeve 370 has a cylindrical shape and forms a body portion of hybrid foil bearing 350. As seen in FIG. 8, axis Z extends down a center of bearing sleeve 370. Bearing sleeve 370 has a first wall thickness $T_1$ at metal mesh portion 360 and a second wall thickness $T_2$ at foil portion 362. First wall thickness $T_1$ is less than second wall thickness $T_2$. In an alternate embodiment, bearing sleeve 370 has the same thickness across bearing sleeve 370.

Metal mesh 372 is a cylindrical shape and is positioned in bearing sleeve 370 adjacent to an inner face of bearing sleeve 370 in metal mesh portion 360. Foil 374 is a cylindrical shape and is positioned in bearing sleeve 370 adjacent to an inner face of bearing sleeve 370 in foil portion 362. Top foil 376 is a cylindrical shape and is positioned in bearing sleeve 370. Top foil 376 is adjacent to inner faces of metal mesh 372 and foil 374.

Hybrid foil bearing 200 shown in FIG. 3, hybrid foil bearing 250 shown in FIG. 6, hybrid foil bearing 300 shown in FIG. 7, and hybrid foil bearing 350 shown in FIG. 8 are all variations of a hybrid foil bearing. Further variations are appreciated and a hybrid foil bearing can include any number of metal mesh portions combined with any number of foil portions with varying arrangements. Air cycle machine 10 shown in FIG. 1 and air compressor 100 shown in FIG. 2 are exemplary rotary machines in which a hybrid foil bearing can be used. Air cycle machine 10 shown in FIG. 1 includes first bearing 70 and second bearing 74 that can be hybrid foil bearings. Air compressor 100 shown in FIG. 2 includes first bearing 130 and second bearing 134 that can be hybrid foil bearings. Any of hybrid foil bearing 200 shown in FIG. 3, hybrid foil bearing 250 shown in FIG. 6, hybrid foil bearing 300 shown in FIG. 7, and hybrid foil bearing 350 shown in FIG. 8 or variations thereof can be used as first bearing 70 and/or second bearing 74 in air cycle machine 10 shown in FIG. 1 and/or first bearing 130 and/or second bearing 134 in air compressor 100 shown in FIG. 2.

Discussion of Possible Embodiments

The following are non-exclusive descriptions of possible embodiments of the present invention.

A bearing includes a bearing sleeve with a first portion and a second portion adjacent to the first portion. A bump foil extends along an inner face of the first portion of the bearing sleeve and a metal mesh extends along an inner face of the second portion of the bearing sleeve. A top foil extends along an inner face of the bump foil of the first portion and the metal mesh of the second portion.

The bearing of the preceding paragraph can optionally include, additionally and/or alternatively, any one or more of the following features, configurations and/or additional components:

The bearing can include a third portion in the bearing sleeve adjacent to the second portion, and a bump foil extending along an inner face of the third portion of the bearing sleeve, wherein the top foil extends along an inner face of the bump foil of the third portion.

The bearing sleeve has a first wall thickness at the first portion and the third portion that is greater than a second wall thickness at the second portion.

The bearing can include a third portion in the bearing sleeve adjacent to the first portion, and a metal mesh extending along an inner face of the third portion of the bearing sleeve, wherein the top foil extends along an inner face of the metal mesh of the third portion.

The bearing sleeve has a first wall thickness at the first portion and the third portion that is lesser than a second wall thickness at the second portion.

The bump foil has a first section having corrugations with a first size and a second section having corrugations with a second size, wherein the first size is larger than the second size.

The bump foil is a first bump foil and the bearing further includes a second bump foil extending along an inner face of the first bump foil, wherein the first bump foil and the second bump foil have different sized corrugations.

A rotary machine includes a shaft that is configured to rotate in the rotary machine, a stationary component positioned outward from the shaft, and a hybrid foil bearing positioned between the shaft and the stationary component. The hybrid foil bearing has a first bump foil portion and a first metal mesh portion adjacent to the first bump foil portion.

The rotary machine of the preceding paragraph can optionally include, additionally and/or alternatively, any one or more of the following features, configurations and/or additional components:

The hybrid foil bearing further includes a bearing sleeve with the first bump foil portion and the first metal mesh portion, a first bump foil positioned in the first bump foil portion of the bearing sleeve, a first metal mesh positioned in the first metal mesh portion of the bearing sleeve, and a top foil extending along an inner face of the first bump foil in the first bump foil portion and the first metal mesh in the first metal mesh portion.

The hybrid foil bearing further includes a second bump foil portion in the bearing sleeve adjacent to the first metal mesh portion, and a second bump foil extending along an inner face of the second bump foil portion of the bearing sleeve, wherein the top foil extends along an inner face of the second bump foil of the second bump foil portion.

The hybrid foil bearing further includes a second metal mesh portion in the bearing sleeve adjacent to the first bump foil portion, and a second metal mesh extending along an inner face of the second metal mesh portion of the bearing sleeve, wherein the top foil extends along an inner face of the second metal mesh of the second metal mesh portion.

The first bump foil has a first section having corrugations with a first size and a second section having corrugations with a second size, wherein the first size is larger than the second size.

The hybrid foil bearing further includes a second bump foil extending along an inner face of the first bump foil, wherein the first bump foil and the second bump foil have different sized corrugations.

The rotary machine can include a tie rod extending along a central axis of the rotary machine, wherein the shaft is configured to rotate with the tie rod; compressor section including a compressor inlet, a compressor outlet, and a compressor rotor, wherein the compressor rotor is configured to rotate with the tie rod; and a motor including a motor housing, a motor stator, and a motor rotor.

The rotary machine can include a tie rod extending along a central axis of the rotary machine, wherein the shaft is configured to rotate with the tie rod; a fan section with a fan inlet, a fan outlet, and a fan rotor, wherein the fan rotor is configured to rotate with the tie rod; a compressor section including a compressor inlet, a compressor outlet, and a compressor rotor, wherein the compressor rotor is configured to rotate with the tie rod; a first turbine section including a first turbine inlet, a first turbine outlet, and a first turbine rotor, wherein the first turbine rotor is configured to rotate with the tie rod; and a second turbine section including a second turbine inlet, a second turbine outlet, and a second turbine rotor, wherein the second turbine rotor is configured to rotate with the tie rod.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A bearing comprising:
a bearing sleeve with a first portion and a second portion adjacent to the first portion;
a plurality of leaf foils extending along an inner face of the first portion of the bearing sleeve;
a metal mesh extending along an inner face of the second portion of the bearing sleeve; and
a top foil extending along an inner face of the metal mesh of the second portion.

2. The bearing of claim 1, wherein the bearing sleeve includes a plurality of notches, wherein a first end of each of the plurality of leaf foils is positioned in one of the plurality of notches.

3. The bearing of claim 1, wherein a second end of each of the plurality of leaf foils overlaps an adjacent leaf foil.

4. The bearing of claim 1, and further comprising:
a third portion in the bearing sleeve adjacent to the second portion; and
a plurality of leaf foils extending along an inner face of the third portion of the bearing sleeve.

5. The bearing of claim 1, and further comprising:
a third portion in the bearing sleeve adjacent to the first portion; and
a metal mesh extending along an inner face of the third portion of the bearing sleeve;
wherein the top foil extends along an inner face of the metal mesh of the third portion.

6. A rotary machine comprising:
a shaft that is configured to rotate in the rotary machine; and
a stationary component positioned outward from the shaft;

wherein the bearing of claim 1 is positioned between the shaft and the stationary component.

7. A bearing comprising:
a bearing sleeve with a first portion and a second portion adjacent to the first portion;
a plurality of foil strips extending along an inner face of the first portion of the bearing sleeve;
a metal mesh extending along an inner face of the second portion of the bearing sleeve; and
a top foil extending along an inner face of the plurality of foil strips of the first portion and the metal mesh of the second portion.

8. The bearing of claim 7, wherein the plurality of foil strips is a first plurality of foil strips positioned in a first region of the first portion, and further comprising a second plurality of foil strips positioned in a second region of the first portion.

9. The bearing of claim 8, wherein a plurality of supports extend into the bearing sleeve and are configured to define the first region and the second region of the first portion.

10. The bearing of claim 8, wherein the first plurality of foil strips are arranged to form cantilevers, and wherein the second plurality of foil strips are arranged to form cantilevers.

11. The bearing of claim 7, and further comprising:
a third portion in the bearing sleeve adjacent to the second portion; and
a plurality of foil strips extending along an inner face of the third portion of the bearing sleeve;
wherein the top foil extends along an inner face of the plurality of foil strips of the third portion.

12. The bearing of claim 7, and further comprising:
a third portion in the bearing sleeve adjacent to the first portion; and
a metal mesh extending along an inner face of the third portion of the bearing sleeve;
wherein the top foil extends along an inner face of the metal mesh of the third portion.

13. A rotary machine comprising:
a shaft that is configured to rotate in the rotary machine; and
a stationary component positioned outward from the shaft;
wherein the bearing of claim 7 is positioned between the shaft and the stationary component.

14. A bearing comprising:
a bearing sleeve with a first portion and a second portion adjacent to the first portion;
a spring foil extending along an inner face of the first portion of the bearing sleeve;
a metal mesh extending along an inner face of the second portion of the bearing sleeve;
a first top foil extending along an inner face of the spring foil of the first portion; and
a second top foil extending along an inner face of the metal mesh of the second portion.

15. The bearing of claim 14, and further comprising:
a first projection extending from the bearing sleeve in the first portion; and
a second projection extending from the bearing sleeve in the first portion.

16. The bearing of claim 15, wherein the first portion includes a first region and a second region defined by the first projection and the second projection.

17. The bearing of claim 16, wherein the spring foil is a first spring foil positioned in the first region and the first top foil extends along an inner face of the first spring foil from the first projection to the second projection, and further comprising:
a second spring foil extending along an inner face of the first portion of the bearing sleeve and positioned in the second region; and
a third top foil extending along an inner face of the second spring foil of the first portion from the second projection to the first projection.

18. The bearing of claim 14, and further comprising:
a third portion in the bearing sleeve adjacent to the second portion;
a spring foil extending along an inner face of the third portion of the bearing sleeve; and
a third top foil extending along an inner face of the spring foil of the third portion.

19. The bearing of claim 14, and further comprising:
a third portion in the bearing sleeve adjacent to the first portion; and
a metal mesh extending along an inner face of the third portion of the bearing sleeve;
wherein the top foil extends along an inner face of the metal mesh of the third portion.

20. A rotary machine comprising:
a shaft that is configured to rotate in the rotary machine; and
a stationary component positioned outward from the shaft;
wherein the bearing of claim 14 is positioned between the shaft and the stationary component.

* * * * *